United States Patent
Djonga et al.

(10) Patent No.: US 9,236,826 B2
(45) Date of Patent: Jan. 12, 2016

(54) CONTROL DEVICE AND METHOD FOR OPERATING AN ELECTRICAL MACHINE DRIVEN BY AN INVERTER

(75) Inventors: Christian Djonga, Heilbronn (DE); Stefan Gaab, Ludwigsburg (DE); Tobias Werner, Fellbach (DE); Michele Hirsch, Esslingen (DE); Michael Heeb, Stuttgart (DE); Markus Kretschmer, Pleidelsheim (DE); Torsten Heidrich, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 14/111,631

(22) PCT Filed: Feb. 15, 2012

(86) PCT No.: PCT/EP2012/052566
§ 371 (c)(1),
(2), (4) Date: Dec. 11, 2013

(87) PCT Pub. No.: WO2012/139792
PCT Pub. Date: Oct. 18, 2012

(65) Prior Publication Data
US 2014/0084830 A1      Mar. 27, 2014

(30) Foreign Application Priority Data
Apr. 15, 2011   (DE) .......................... 10 2011 007 491

(51) Int. Cl.
*H02P 27/06* (2006.01)
*H02P 29/00* (2006.01)
(Continued)

(52) U.S. Cl.
CPC ............ *H02P 27/06* (2013.01); *G01K 7/427* (2013.01); *H02H 6/00* (2013.01); *H02P 29/0088* (2013.01); *H02P 29/028* (2013.01); *G01K 2217/00* (2013.01); *H02M 2001/327* (2013.01)

(58) Field of Classification Search
CPC ... H02P 27/06; H02P 29/028; H02P 29/0088; H02M 2001/327; G01K 2217/00
See application file for complete search history.

(56) References Cited

U.S. PATENT DOCUMENTS

| 7,012,810 B2 * | 3/2006 | Parkhill et al. ................. 361/775 |
| 2005/0204761 A1 | 9/2005 | Karikomi et al. |
| 2009/0072770 A1 | 3/2009 | Son et al. |

(Continued)

FOREIGN PATENT DOCUMENTS

| DE | 102006001874 | 7/2007 |
| DE | 102008026541 | 2/2009 |
| EP | 1768238 | 3/2007 |

OTHER PUBLICATIONS

International Search Report for Application No. PCT/EP2012/052566 dated Apr. 5, 2013 (English Translation, 3 pages).

*Primary Examiner* — Karen Masih
(74) *Attorney, Agent, or Firm* — Michael Best & Friedrich LLP

(57) ABSTRACT

The invention relates to a method for operating an electrical machine (1) controlled by an inverter (2), wherein the inverter (2) comprises half-bridge branches (10-U, 10-V, 10-W) having power components in the form of controllable power switching elements (3) and power diodes (4) respectively connected in parallel therewith, wherein each of the half-bridge branches (10-U; 10-V; 10-W) is arranged on a separate semiconductor module (11-U; 11-V; 11-W), which are arranged jointly on a baseplate (12), wherein the phase currents (1_U, 1_V, 1_W) flowing through the half-bridge branches (10-U, 10-V, 10-W), the voltages present at the power components and temperatures (t_Sens_U, t_Sens_V, t_Sens_W) on the semiconductor modules (11-U, 11-V, 11-W) are determined, from the current (1_U; 1_V; 1_W) respectively flowing at a power component and from the voltage respectively present a power loss (P) is calculated for each of the power components, from the power losses (P) a relevant temperature swing (Δt; Δt_Sens) is determined for each of the power components and for temperature sensors (13-U, 13-V, 13-W) serving to determine the temperatures on the semiconductor modules, a temperature (TempCooler) of the baseplate (12) is determined from the determined temperatures (t_Sens_U, t_Sens_V, t_Sens_W) on the semiconductor modules (11-u, 11-V, 11-W) and the determined temperature swings (Δt_Sens) at the temperature sensors (13-U, 13-V, 13-W), and a torque or a power of the electrical machine (1) is determined in a manner dependent on the determined temperature swings (Δt) and the determined temperature (TempCooler) of the baseplate (12).

10 Claims, 3 Drawing Sheets

(51) Int. Cl.
   *H02H 6/00*   (2006.01)
   *G01K 7/42*   (2006.01)
   *H02P 29/02*  (2006.01)
   *H02M 1/32*   (2007.01)

(56) References Cited

U.S. PATENT DOCUMENTS

2009/0276165 A1   11/2009   Weiss et al.

\* cited by examiner

CONTROL DEVICE AND METHOD FOR OPERATING AN ELECTRICAL MACHINE DRIVEN BY AN INVERTER

BACKGROUND OF THE INVENTION

The invention relates to a control device and a method for operating an electrical machine driven by an inverter.

For the drive in hybrid or electric vehicles, use is generally made of electrical machines in the form of polyphase machines which are operated in conjunction with inverters. In this case, the electrical machines are optionally operated in the motor or generator mode. In the motor mode, the electrical machine generates a drive torque which, in the case of use in a hybrid vehicle, supports an internal combustion engine, for example in an acceleration phase. In the generator mode, the electrical machine generates electrical energy which is stored in an energy store, such as, for example, a battery or a supercab. Operating mode and power of the electrical machine are set via the inverter.

Known inverters comprise a series of switching elements used for optionally switching the individual phases of the electrical machine relative to a high supply voltage potential or relative to a low supply voltage potential. Two series-connected switching elements here in each case form a half-bridge branch, wherein a first switching element is connected to the high supply voltage potential and a second switching element is connected to the low supply voltage potential. Each phase of the electrical machine is then connected to a respective half-bridge branch. The switching elements are controlled by an external control unit, which calculates a desired operating point for the electrical machine depending on the driver's desire (acceleration or braking) The inverter is connected to the control unit and receives the corresponding operating data or control commands from it.

In the case of electrical machines which are controlled via an inverter, the semiconductor power components of the inverter—designated hereinafter as power components for short—are subjected to a high thermal loading primarily during operation with high currents at low rotational speeds. In this regard, e.g. electric vehicles or hybrid vehicles in the purely electric driving mode must be able to start exclusively with the aid of the electrical machine. If the electrical machine in this case is connected to the drive and thus the wheels of the vehicle without a rotational-speed-compensating coupling element, such as e.g. a torque converter or a friction clutch, then the electrical machine has to provide the necessary starting torque beginning from a rotational speed of "zero". Particularly high starting torques are required e.g. at steep inclines or else at curb edges.

If the electrical machine is embodied as a synchronous machine, for example, then the torque-generating field in the stator is directly coupled to the rotational speed of the machine. As a result, the electric field does not vary at a rotational speed of zero or varies only very slowly at low rotational speeds, but that has the consequence that the field-generating inverter has to provide the required current for a longer time with the same power components. Accordingly, the loading of the power components of the inverter is not uniform in this operating range, such that different temperatures occur at the power components. At higher rotational speeds, by contrast, temperature differences hardly occur since the thermal time constants are considerably greater than the commutation times of the power components.

Since the temperature swings that occur at the power components of the inverter crucially influence the lifetime of these components, it is necessary to limit the temperature swing in the power components. For this purpose, in the event of a limit value for the temperature swing being reached, the current for generating the torque-generating field is reduced and the torque or the power of the electrical machine is thus limited.

EP 1 768 238 A1 discloses a method for limiting the temperature of an output stage of an electric motor, wherein the temperature of at least one bridge component contained in the output stage is determined by virtue of the fact that the phase current flowing through the bridge component is measured, the power loss of the bridge component is calculated from the phase current, the temperature increase arising at the bridge component is determined from the power loss and the temperature of a baseplate of the output stage is added to the temperature increase. If the determined temperature of the bridge component exceeds a specific maximum temperature, the output torque of the electric motor is reduced.

SUMMARY OF THE INVENTION

The present invention provides a method for operating an n-phase electrical machine, where $n \geq 1$, controlled by an inverter, wherein the inverter comprises n half-bridge branches having power components in the form of controllable power switching elements and power diodes respectively connected in parallel therewith, wherein each of the half-bridge branches is arranged on a separate semiconductor module, which are arranged jointly on a baseplate. At least for a rotational speed range of the electrical machine below a predefinable rotational speed threshold value, the phase currents flowing through the half-bridge branches, the voltages and temperatures present at the power components on the semiconductor modules are determined. From the current respectively flowing at a power component and from the voltage respectively present, a power loss is calculated for each of the power components. From the power losses a respective temperature swing is then determined for each of the power components and for temperature sensors serving to determine the temperatures on the semiconductor modules. A temperature of the baseplate is then determined from the determined temperatures on the semiconductor modules and the determined temperature swings at the temperature sensors, and a torque or a power of the electrical machine is finally established in a manner dependent on the determined temperature swings and the determined temperature of the baseplate.

In accordance with a further embodiment, the invention provides a control device for operating an n-phase electrical machine, where $n \geq 1$, controlled by an inverter, wherein the inverter comprises n half-bridge branches having power components in the form of controllable power switching elements and power diodes respectively connected in parallel therewith, wherein each of the half-bridge branches is arranged on a separate semiconductor module, which are arranged jointly on a baseplate, comprising a detection device, which is designed to determine, at least for a rotational speed range of the electrical machine below a predefinable rotational speed threshold value, the phase currents flowing through the half-bridge branches and the voltages and temperatures present at the power components on the semiconductor modules, a first calculation device, which is designed to calculate, from the phase current respectively flowing at a power component and from the voltage respectively present, a power loss for each of the power components, a second calculation device, which is designed to determine from the power losses a respective temperature swing for each of the power components and for temperature sensors serving to determine the temperatures on the semiconductor modules, a third calculation device, which is designed to determine a temperature of the baseplate from the determined temperatures on the semiconductor modules and the determined temperature swings at the temperature sensors, and a fourth calculation device, which is designed to establish a torque or a power of the electrical machine in a manner dependent on the determined temperature swings and the determined temperature of the baseplate.

In accordance with a further embodiment, the invention provides a system, comprising a control device according to the invention, an inverter having n half-bridge branches having power components in the form of controllable power switching elements and power diodes respectively connected in parallel therewith, wherein each of the half-bridge branches is arranged on a separate semiconductor module, which are arranged jointly on a baseplate, and an n-phase electrical machine, where n≥1, controlled by the inverter.

The device according to the invention is based on the basic concept of determining the respective temperature swing for each of the power components of the inverter with simple means on the basis of operating variables present, such that a limitation of the current and thus of the torque or of the power of the electrical machine, without the lifetime of the power components being impaired, can be restricted to operating cases in which a real jeapordization or adverse influencing of the lifetime of a power component occurs. In this case, any change in loading at the power components is advantageously also taken into account as well. In this regard, as a result of extremely small rotations of the electrical machine for which recommutation or changeover to other power components is carried out, the torque can be provided without reduction for longer, without exceeding a maximum permissible temperature swing at the power components in the process. In this way, for example, the startability of vehicles with an electric drive can be considerably improved since a sufficient starting torque can be made available even at low rotational speeds of the electrical machine. This is helpful particularly during starting processes on gradients, since particularly high starting torques are required there. A "precautionary" reduction of the torque or power is no longer required.

In the method according to the invention, the present power losses are determined for each individual power component, that is to say power switching elements and power diodes, on the basis of the currents and voltages present, such that from the respective power losses the temperature swings can be simulated in each individual power component on the basis of a respective transfer function. In this case, the thermal dependencies between the power components and the temperature sensors that measure the temperatures on the semiconductor modules are also simulated from the power losses on the basis of a transfer function, such that the temperature of the baseplate or cooler plate can also be taken into account to a sufficient extent.

Since appreciable temperature differences between the individual power components of the inverter occur essentially only at low rotational speeds, it suffices to apply the method according to the invention in a rotational speed range of the electrical machine below a predefinable rotational speed threshold value. However, the method according to the invention can be applied, in principle, independently of the rotational speed of the electrical machine.

In order to be able to take account of the different thermal loading capacities of power switching elements and power diodes, in accordance with one embodiment of the invention it is provided that a maximum temperature swing at the power switching elements is determined from the determined temperature swings at the power switching elements, a maximum temperature swing at the power diodes is determined from the determined temperature swings ($\Delta t$) at the power diodes, and the torque or the power of the electrical machine is established in a manner dependent on the determined maximum temperature swings at the power switching elements and the power diodes.

Besides the temperature swings that occur, the absolute temperatures at the power components also influence the lifetime thereof. Therefore, in accordance with one embodiment of the invention it is provided that, from the determined temperature of the baseplate and the determined maximum temperature swings at the power switching elements and the power diodes, a maximum value of an absolute temperature of the power switching elements and, respectively, a maximum value of an absolute temperature of the power diodes are determined, and the torque or the power of the electrical machine is also established in a manner dependent on the determined maximum values of the absolute temperatures at the power switching elements and for the power diodes.

In accordance with a further embodiment of the invention, for determining the temperature of the baseplate, the temperature swing determined for the temperature sensor on a semiconductor module is subtracted from the temperature detected by the temperature sensor on a semiconductor module. The temperature of the baseplate is then determined by averaging from the temperature values determined in this way. Inter alia, measurement inaccuracies of the temperature sensors are also compensated for in this way.

In accordance with one embodiment of the invention, the temperature swing at a temperature sensor on a semiconductor module is determined from the power losses of at least one power component on said semiconductor module with the aid of at least one transfer function. Since, depending on the arrangement of the temperature sensor on the semiconductor module, not all the power components influence the temperature swing at the temperature sensor, for the purpose of reducing the computational complexity it can be provided that only the power losses of those power components which have a thermal influence on the temperature sensor are taken into account.

Since, depending on the arrangement of the temperature sensor on the semiconductor module, the power components have a different influence on the temperature swing at the temperature sensor, a further embodiment of the invention provides that, from the power losses of the individual power components, with the aid of respectively assigned and mutually different transfer functions, temperature swing portions are in each case determined. The temperature swing at a temperature sensor is then determined by summation of the individual temperature swing portions.

In order to avoid permanent damage to and/or adverse influencing of the lifetime of the power components of the inverter, the torque or the power of the electrical machine can be limited to a predefinable maximum value if the determined temperature swings and/or the determined absolute temperature values exceed predefinable limit values.

BRIEF DESCRIPTION OF THE DRAWINGS

Further features and advantages of embodiments of the invention are evident from the following description with reference to the accompanying figures.

In the figures.

DETAILED DESCRIPTION

Figure 1:
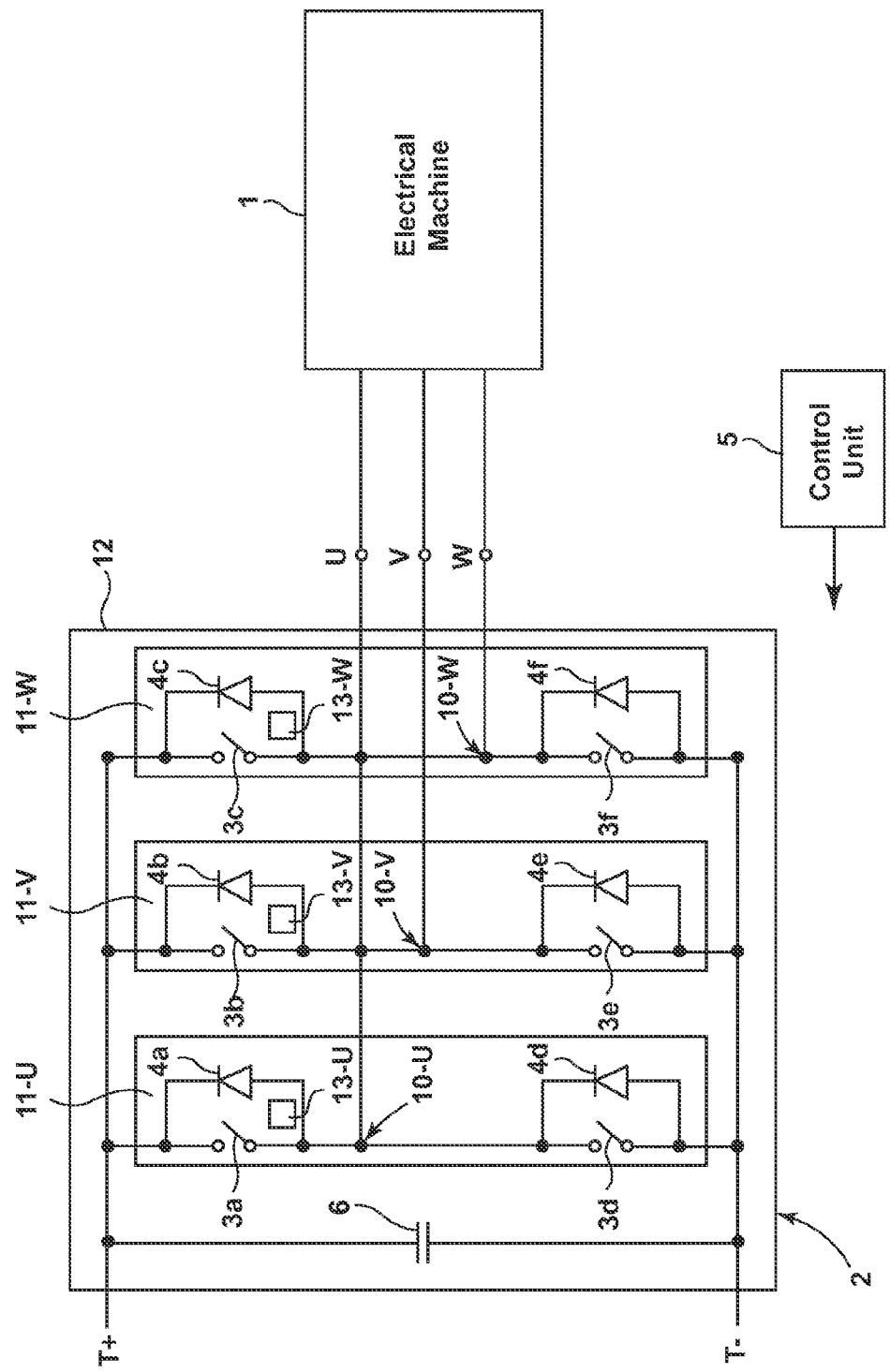
FIG. 1 shows a schematic block diagram of an electrical machine controlled by an inverter.

FIG. 1 shows a schematic illustration of a three-phase electrical machine 1, which can be embodied for example as a synchronous, asynchronous or reluctance machine, with an inverter 2 connected thereto. The inverter 2 comprises power switching elements 3a-3f in the form of power switches, which are connected to individual phases U, V, W of the electrical machine 1 and switch the phases U, V, W either relative to a high supply voltage potential T+ or a low supply voltage potential T−. In this case, the power switching elements 3a-3c connected to the high supply voltage potential T+ are also designated as "high-side switches" and the power switching elements 3d-3f connected to the low supply voltage potential T− are also designated as "low-side switches" and can be embodied for example as insulated gate bipolar transistor (IGBT) or as metal oxide semiconductor field effect transistor (MOSFET). The inverter 2 furthermore comprises a plurality of freewheeling diodes in the form of power diodes 4a-4f respectively arranged in parallel with one of the switching elements 3a-3f. In this case, the switching elements 3a and 3d, 3b and 3e, and 3c and 3f together with the respectively assigned power diodes 4a-4f in each case form a half-bridge branch 10-U, 10-V and 10-W, respectively, which are respectively assigned to one of the phases U, V, W of the electrical machine 1.

The half-bridge branches 10-U, 10-V and 10-W are in each case arranged on a separate semiconductor module 11-U and 11-V and 11-W, respectively. The semiconductor module 11-U, 11-V and 11-W in turn are arranged on a common baseplate 12, which inter alia also performs the function of a cooling plate for the power components. In each case at least one temperature sensor 13-U and 13-V and 13-W is arranged on each of the semiconductor modules 11-U, 11-V and 11-W, respectively, and can be used to measure the temperature on the respective semiconductor module 11-U and 11-V and 11-W.

The inverter 2 determines the power and operating mode of the electrical machine 1 and is correspondingly controlled by a first control unit 5 (merely illustrated schematically), which can also be integrated into the inverter 2. In this case, the electrical machine 1 can optionally be operated in the motor or generator mode.

A so-called intermediate circuit capacitor 6 is arranged in parallel with the pulse-controlled inverter 2, which intermediate circuit capacitor can also be integrated into the pulse-controlled inverter 2 and serves substantially for stabilizing the intermediate circuit voltage in the pulse-controlled inverter 2.

In the exemplary embodiment illustrated, the electrical machine 1 is embodied in three-phase fashion, but can also have fewer or more than three phases.

Figure 2:
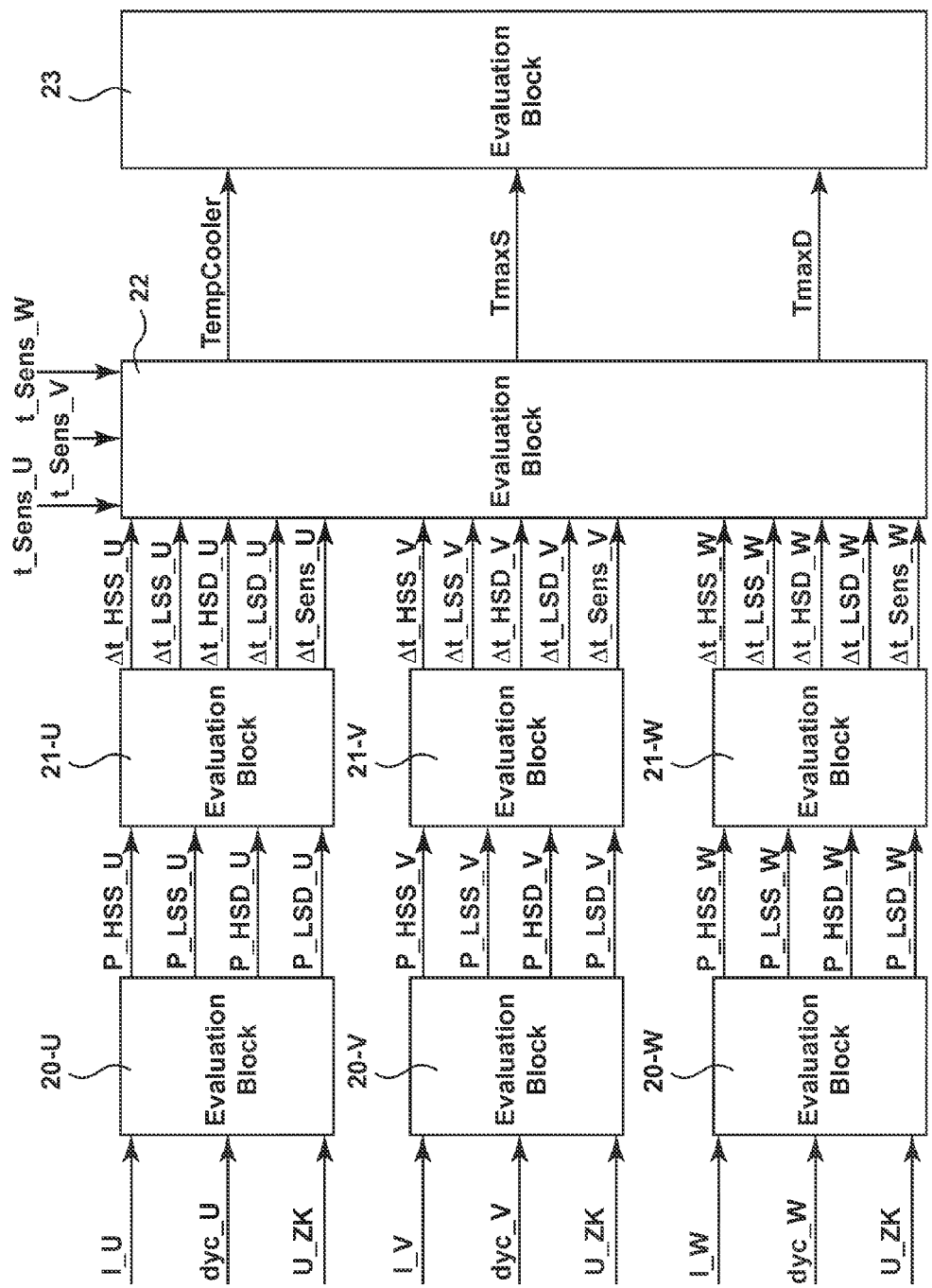
FIG. 2 shows a schematic block diagram of a control device for carrying out the method according to the invention for operating an electrical machine controlled by an inverter.

One embodiment of the method according to the invention is explained below with reference to FIG. 2. In this case, the evaluation blocks illustrated below can in each case be encompassed as calculation devices in a control device for the inverter 2, for example in the control unit 5 illustrated in FIG. 1. In one embodiment, the evaluation blocks or calculation devices can expediently be combined in a common calculation device.

A first evaluation block 20-U and 20-V and 20-W is respectively provided for each of the three phases U, V, W of the electrical machine and thus for each of the half-bridge branches 10-U, 10-V and 10-W of the inverter 2. The first evaluation blocks 20-U and 20-V and 20-W can be configured in a first calculation device. A present phase current I_U and I_V and I_W, a duty cycle dyc_U and dyc_V and dyc_W of the power switching elements 3 of the respective semiconductor branch 10-U and 10-V and 10-W, and a present voltage U_ZK at the intermediate circuit capacitor 6 are in each case fed to the first evaluation blocks 20-U, 20-V and 20-W, respectively. In this case, the intermediate circuit voltage U_ZK in conjunction with the respective duty cycle dyc characterizes a voltage present at the respective power component. From these input variables, a present power loss P is calculated in the first evaluation blocks 20-U, 20-V and 20-W for all the power components of the respective half-bridge branch 10-U and 10-V and 10-W, that is to say for the high-side switch (HSS) 3a and 3b and 3c, respectively, the low-side switch (LSS) 3d and 3e and 3f, respectively, the high-side diode (HSD) 4a and 4b and 4c, respectively, and the low-side diode (LSD) 4-d and 4e and 4f, respectively.

In second evaluation blocks 21-U, 21-V and 21-W connected downstream of the first evaluation blocks 20-U and 20-V and 20-W, respectively, the temperature swings Δt at all the power components 3a-f and 4a-f are determined from the power losses P at the respective switching elements 3 and power diodes 4 with the aid of transfer functions. The second evaluation blocks 21-U, 21-V and 21-W can be configured in a second calculation device. In addition, temperature swings Δt_Sens for the respective temperature sensors 13-U, 13-V and 13-W are determined from the power losses P at the respective switching elements 3 and power diodes 4 with the aid of further transfer functions. In this case, respectively different transfer functions can be provided for the individual power components, that is to say the power switching elements 3 and the power diodes 4.

All the determined temperature swings Δt at the power components and all the determined temperature swings Δt_Sens for the temperature sensors 13 are fed to a third evaluation block 22 connected downstream of the second evaluation blocks 21. The third evaluation block 22 can be configured as a third calculation device, for example. The temperatures t_Sens_U and t_Sens_V and t_Sens_W on the respectively affected semiconductor modules 11-U and 11-V and 11-W, said temperatures being determined with the aid of the temperature sensors 13-U, 13-V and 13-W, respectively, are also fed to the third evaluation block 22. By means of the subtraction of the determined temperature swings Δt_Sens for the respective temperature sensors 13-U, 13-V and 13-W from the temperatures on the semiconductor modules 11 respectively measured by said sensors 13, a temperature value for the baseplate 12 is in each case determined in the third evaluation block 22. From these temperature values for the baseplate 12, a temperature TempCooler of the baseplate 12 and thus a cooler temperature is then determined by averaging, e.g. arithmetic mean value formation.

In addition, in the third evaluation block 22, a maximum temperature swing at the power switching elements 3 is determined from the determined temperature swings Δt at the power switching elements 3 by maximum value formation and a maximum temperature swing at the power diodes 4 is determined from the determined temperature swings Δt at the power diodes 4 by maximum value formation. A maximum value TmaxS of an absolute temperature of the power switching elements 3 is subsequently determined by the addition of the baseplate temperature TempCooler to the maximum temperature swing at the power switching elements 3. A maximum value TmaxD of an absolute temperature of the power diodes 4 is likewise determined by the addition of the baseplate temperature TempCooler to the maximum temperature swing at the power diodes 4. The two maximum values TmaxS and TmaxD are then transferred together with the determined temperature TempCooler of the baseplate 12 to a fourth evaluation block 23, which, depending on these variables or else on variables derived therefrom, establishes a torque or a power of the electrical machine 1. The fourth evaluation block 23 can be configured as a fourth calculation device, for example. In particular, the torque or the power of the electrical machine is limited to a predefinable maximum value if the determined temperature swings and/or the determined absolute temperature values exceed predefinable limit values.

Figure 3:
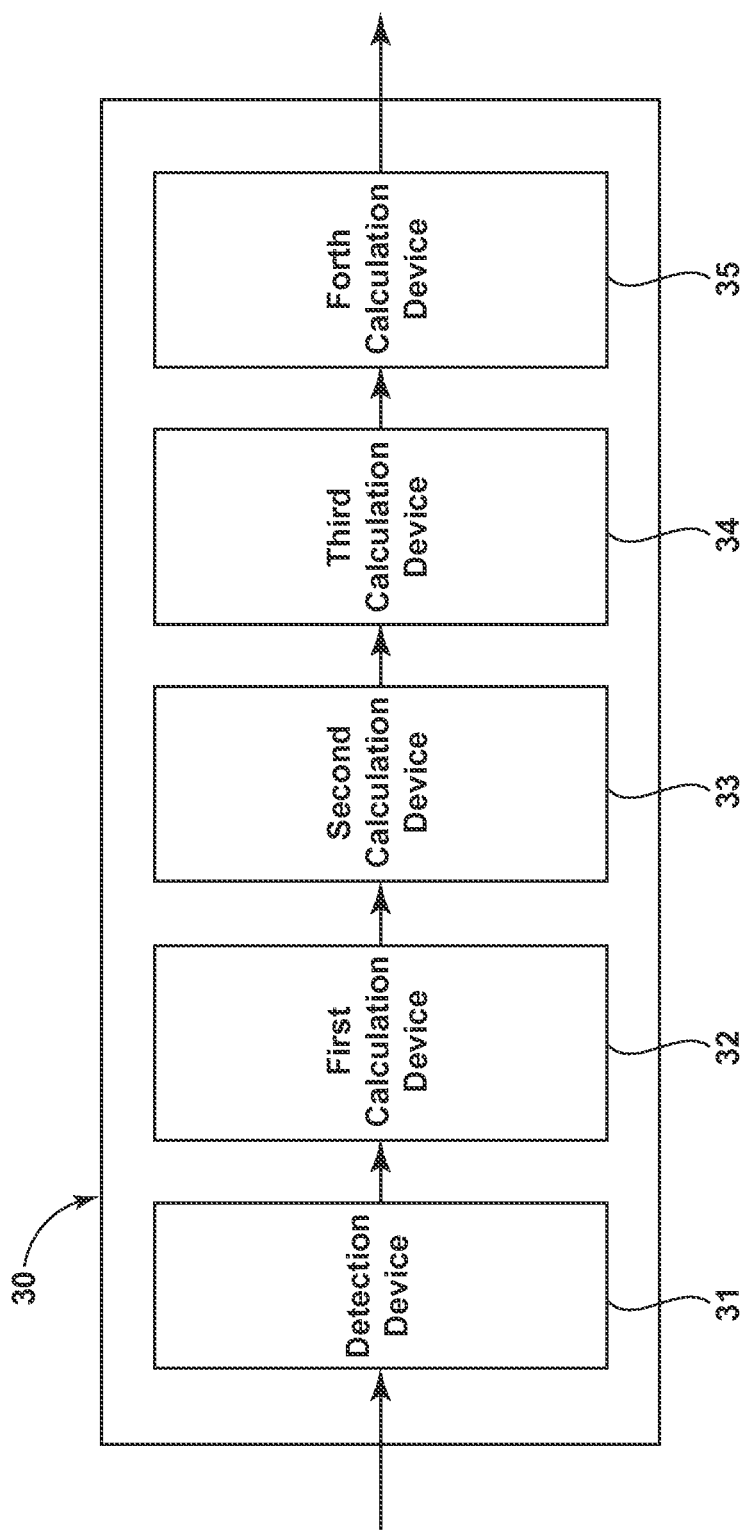
FIG. 3 shows a schematic illustration of a control device for controlling an inverter for operating an electrical machine.

FIG. 3 shows a control device for operating an n-phase electrical machine controlled by an inverter in accordance with one embodiment. The control device 30 can be similar in particular to the control unit 5 in FIG. 1. It can also be provided that the control device 30 is encompassed in the control unit 5. The control device 30 can serve in particular for controlling the pulse-controlled inverter 2 in FIG. 1 and can in this case configure the functionality of the control steps explained in association with FIG. 2.

The control device 30 comprises a detection device 31, a first calculation device 32, a second calculation device 33, a third calculation device 34 and a fourth calculation device 35.

The detection device 31 is designed to determine, at least for a rotational speed range of an electrical machine 1 below a predefinable rotational speed threshold value, the phase currents flowing through the half-bridge branches 10-U, 10-V and 10-W of the pulse-controlled inverter 2 to be controlled and the voltages and temperatures present at the power components on the semiconductor modules 11-U, 11-V and 11-W. The first calculation device 32 is designed to calculate, from the phase current respectively flowing at a power component and from the voltage respectively present, a power loss P for each of the power components. The second calculation device 33 is designed to determine from the power losses P a respective temperature swing Δt for each of the power components and for temperature sensors 13-U, 13-V and 13-W serving to determine the temperatures on the semiconductor modules 11-U, 11-V and 11-W, respectively. The third calculation device 34 is designed to determine a temperature of the baseplate 12 from the determined temperatures on the semiconductor modules 11-U, 11-V and 11-W and the determined temperature swings at the temperature sensors 13-U, 13-V and 13-W, respectively. The fourth calculation device 35 is designed to establish a torque or a power of the electrical machine 1 in a manner dependent on the determined temperature swings Δt and the determined temperature of the baseplate 12.

The invention claimed is:

1. A method for operating an n-phase electrical machine, where n≥1, controlled by an inverter, wherein the inverter comprises n half-bridge branches having power components in the form of controllable power switching elements and power diodes respectively connected in parallel therewith, wherein each of the half-bridge branches is arranged on a separate semiconductor module, which are arranged jointly on a baseplate, wherein, at least for a rotational speed range of the electrical machine below a predefinable rotational speed threshold value,
the phase currents flowing through the half-bridge branches, the voltages and temperatures present at the power components on the semiconductor modules are determined,
from the current respectively flowing at a power component and from the voltage respectively present, a power loss is calculated for each of the power components,
from the power losses a respective temperature swing is determined for each of the power components and for temperature sensors serving to determine the temperatures on the semiconductor modules,
a temperature of the baseplate is determined from the determined temperatures on the semiconductor modules and the determined temperature swings at the temperature sensors, and
a torque or a power of the electrical machine is established in a manner dependent on the determined temperature swings and the determined temperature of the baseplate.

2. The method as claimed in claim 1, wherein a maximum temperature swing at the power switching elements is determined from the determined temperature swings at the power switching elements, a maximum temperature swing at the power diodes is determined from the determined temperature swings at the power diodes, and the torque or the power of the electrical machine is established in a manner dependent on the determined maximum temperature swings at the power switching elements and the power diodes.

3. The method as claimed in claim 2, wherein, from the determined temperature of the baseplate and the determined maximum temperature swings at the power switching elements and the power diodes, a maximum value of an absolute temperature of the power switching elements and, respectively, a maximum value of an absolute temperature of the power diodes are determined, and the torque or the power of the electrical machine is established in a manner dependent on the maximum values formed for the power switching elements and for the power diodes.

4. The method as claimed in claim 1, wherein, for determining the temperature of the baseplate,
the temperature swing determined for the temperature sensor on a semiconductor module is subtracted from the temperature detected by the temperature sensor on the semiconductor module, and
the temperature of the baseplate is determined by averaging from the temperature values determined in this way.

5. The method as claimed in claim 1, wherein the temperature swing at a temperature sensor on a semiconductor module is determined from the power loss of at least one power component on said semiconductor module with the aid of at least one transfer function.

6. The method as claimed in claim 5, wherein only the power losses of those power components which have a thermal influence on the temperature sensor are taken into account.

7. The method as claimed in claim 5, wherein, from the power losses of the individual power components, with the aid of respectively assigned and mutually different transfer functions, temperature swing portions are in each case determined and the temperature swing at a temperature sensor is determined by summation of the individual temperature swing portions.

8. The method as claimed in claim 2, wherein the torque or the power of the electrical machine is limited to a predefinable maximum value if the determined temperature swings and/or the determined absolute temperature values exceed predefinable limit values.

9. A control device for operating an n-phase electrical machine, where n≥1, controlled by an inverter, wherein the inverter comprises n half-bridge branches having power components in the form of controllable power switching elements and power diodes respectively connected in parallel therewith, wherein each of the half-bridge branches is arranged on a separate semiconductor module, which are arranged jointly on a baseplate, comprising:
a detection device, which is designed to determine, at least for a rotational speed range of the electrical machine below a predefinable rotational speed threshold value, the phase currents flowing through the half-bridge branches and the voltages and temperatures present at the power components on the semiconductor modules;

a first calculation device, which is designed to calculate, from the phase current respectively flowing at a power component and from the voltage respectively present, a power loss for each of the power components;

a second calculation device, which is designed to determine from the power losses a respective temperature swing for each of the power components and for temperature sensors serving to determine the temperatures on the semiconductor modules;

a third calculation device, which is designed to determine a temperature of the baseplate from the determined temperatures on the semiconductor modules and the determined temperature swings at the temperature sensors; and a fourth calculation device, which is designed to establish a torque or a power of the electrical machine in a manner dependent on the determined temperature swings and the determined temperature of the baseplate.

10. A system, comprising:

a control device as claimed in claim 9;

an inverter having n half-bridge branches having power components in the form of controllable power switching elements and power diodes respectively connected in parallel therewith, wherein each of the half-bridge branches is arranged on a separate semiconductor module, which are arranged jointly on a baseplate; and an n-phase electrical machine, where n≥1, controlled by the inverter.

* * * * *